Patented Oct. 13, 1953

2,655,515

UNITED STATES PATENT OFFICE 2,655,515

ARYLAMINOACEDIANTHRONE ISOTHIO-URONIUM SALTS

Frank Lodge and James Wardleworth, Blackley, Manchester, England, assignors to Imperial Chemical Industries Limited, a corporation of Great Britain No Drawing. Application June 18, 1951, Serial No. 232,242. In Great Britain June 26, 1950

6 Claims. (Cl. 260—351)

This invention relates to new dyestuffs and more particularly to new dyestuffs of the acedianthrone series.

In British specification No. 613,980 it was proposed to manufacture new dyestuffs by treating compounds of the anthraquinone series and related types which carry one or more chloromethyl or bromomethyl groups, by known methods for replacing the chlorine or bromine atoms of chloromethyl or bromomethyl groups by isothiouronium salt groups, for example by treating with a thiourea. Among the compounds of the anthraquinone series and related type mentioned were chloromethyl- and bromomethyl- derivatives of acedianthrone and also chloromethyl derivatives of certain other condensed ring compounds related to anthraquinone carrying at least one pendent aryl nucleus connected through for example an —NH— linkage. No acedianthrone compounds with pendent aryl nuclei were mentioned in the specification.

We have found that the new brown dyestuffs made by reacting with a thiourea, the chloromethyl or bromomethyl derivatives of acedianthrones which carry at least one arylaminogroup, have better affinity for cotton than the hitherto known acedianthrone dyestuffs of this kind made from thiourea and halogenomethyl derivatives of acedianthrones which are free from pendent aryl groups, and they have better light fastness than the known brown dyestuffs of this kind made from thioureas and halogenomethyl derivatives of other condensed ring compounds related to anthraquinone which carry aryl nuclei.

According to our invention therefore we provide as new dyestuffs the arylaminoacedianthrones which carry at least one —CH₂—X group attached to the aryl nucleous, where X is an isothiouronium salt group.

According to a further feature of our invention we provide a process for the manufacture of new dyestuffs which comprises treating with thiourea or a substituted thiourea and arylaminoacedianthrone which carries at least one chloromethyl- or bromomethyl- group attached to the aryl nucleus.

The starting materials for the process of our invention may be made by nitrating acedianthrone in sulphuric acid or nitrobenzene, condensing the nitro compound with an arylamine, for example p-toluidine and halogeno-methylating the arylaminoacedianthrone so obtained, by treating it with sym-dichlorodimethyl ether or sym-dibromodimethyl ether in the presence of sulphuric acid or in the presence of aluminium chloride and pyridine. Alternatively the intermediate arylaminoacedianthrone may be formed by reducing the nitro-compound to the amino-compound and condensing the latter with a halogenoaryl compound.

As starting materials there may be used for example the mono-, di-, tri- or tetra-(halogenomethyl)-derivatives of anilino-, p-toluidino-, p-chloroanilino, o- or p-anisidino-, m-4-xylidino-, p-acetyl-aminoanilino-, p-phenyl- or p-phenoxyanilino, and α-naphthylamino-acedianthrones. If desired, compounds containing 2 or more arylamino groups (made from dinitro or polynitroacedianthrones) may be used.

As thioureas there may be used for example, thiourea itself, N-methylthiourea, N-phenylthiourea, N:N'-dimethylthiourea, N:N-dimethylthiourea, N:N:N'-trimethylthiourea, N:N:N':N'-tetramethylthiourea and ethylenethiourea.

The reaction between the chloromethyl-compound and the thiourea may be brought about by simply heating the reagents together, if desired in the presence of a diluent, for example water. When the reaction is carried out in the presence of water, the new dyestuff may be isolated by precipitating it by the addition of acetone and filtering off.

The invention is illustrated but not limited by the following examples in which the parts are by weight:

*Example 1*

4.5 parts of p-toluidinoacedianthrone (which may be prepared by condensing p-bromo-toluene with aminoacedianthrone or by condensing p-toluidine with nitro-acedianthrone) are dissolved at 15–20° C. in 55 parts of 96% sulphuric acid, 7 parts of 1:1'-dichlorodimethyl ether are added, and the mixture is stirred at 15–20° C. for 18 hours. The mixture is poured onto ice and the product is filtered off, washed with water until free from acid and dried to give a brown powder, which is mainly the bis-(chloromethyl)-compound and which dissolves in concentrated sulphuric acid to give a dull-violet solution.

30 parts of the above bis-(chloromethyl)-compound are mixed with 120 parts of tetramethylthiourea and 120 parts of water and the mixture is stirred at 85–90° C. for ½ hour. The brown solution so obtained is cooled to 60° C., 500 parts of acetone are added and the mixture is cooled to 25° C. The precipitated solid is filtered off, washed with acetone and dried below 60° C. The product consists of a brown powder, which dissolves in water to a yellow brown solution, and which dyes and prints cellulosic fibres in yellow-brown shades of good fastness properties.

Example 2

25 parts of p-phenoxyanilinoacedianthrone (which may be prepared by condensing 4-bromodiphenyl ether with aminoacedianthrone) are dissolved in 368 parts of 98% sulphuric acid at 10–15° C. 26 parts of 1:1-dichlorodimethyl ether are added and the temperature is allowed to rise to 20° C. The mixture is stirred at 20° C., for 18 hours. The mixture is then poured on to ice and the solid product is filtered off, washed with water until free from acid and dried at 60° C., to give a dark brown powder containing approximately 4 chloromethyl groups per molecule.

25 parts of the above chloromethyl compound, 80 parts of tetramethylthiourea and 100 parts of water are stirred together at 95–100° C., for 1 hour. The brown solution is cooled to 50° C., 600 parts of acetone are added and the mixture so obtained is cooled to 25° C. The solid which precipitates is filtered off, washed with acetone and dried at 40° S., to give a brown powder, suitable for printing cellulosic fibres in brown shades.

When 25 parts of o-anisidino-acedianthrone is used instead of the 25 parts of p-phenoxyanilino-acedianthrone in the chloromethylation stage, a product is obtained which consists mainly of bis - (chloromethyl) - o - anisidino - acedianthrone, which on reaction with tetramethylthiourea and water gives a brown dyestuff of similar properties to the above.

Example 3

25 parts of p-toluidinoacedianthrone dissolved in 368 parts of 98% sulphuric acid are stirred with 26 parts of 1:1'-dichlorodimethyl ether at 20° C., for 18 hours and the mixture is then poured onto ice. The precipitated solid is filtered off, washed with water until free from acid and dried to give a dark brown powder consisting mainly of the tris-chloromethyl compound.

The tris-chloromethyl compound so obtained is converted to the tetramethylthiourea salt as described in Example 2. The product dissolves in cold water to give a yellow-brown solution which prints cellulosic fibers in brown shades of good fastness properties.

By carrying out the chloromethylation at 35–40° C., a product is obtained which on conversion to the tetramethylthiourea salt gives a dyestuff duller and redder in shade than the above.

Example 4

25 parts of tris-(chloromethyl)-toluidino-acedianthrone obtained by the method of Example 3, 80 parts of thiourea and 100 parts of water are stirred at 90–95° C., for 1 hour. The mixture is cooled to 60° C., and 400 parts of acetone are added. The precipitated solid is collected, washed with acetone and dried to give a brown powder which prints cellulosic fibres in brown shades.

Similar dyes are obtained by using N:N'-dimethylthiourea, ethylenethiourea or trimethylthiourea instead of the thiourea in the above example.

Example 5

50 parts of p-phenylanilinoacedianthrone are dissolved in 700 parts of 90% sulphuric acid at 0–5° C. 66 parts of 1:1'-dichlorodimethyl ether are added, the temperature is raised to 20° C., over 1 hour, and the mixture is stirred at 20° C., for 18 hours. The mixture is then poured onto ice and the solid in suspension is collected, washed with water until free from acid, and dried at 60° C., to give a dark brown powder consisting mainly of the bis-(chloromethyl)-compound.

The product is converted to the tetramethylthiourea salt as described in Example 2 to give a product which prints cellulosic fibres in yellow-brown shades.

What we claim is:

1. As new dyestuffs possessing improved affinity for cotton and light fastness, the arylaminoacedianthrones having the general formula

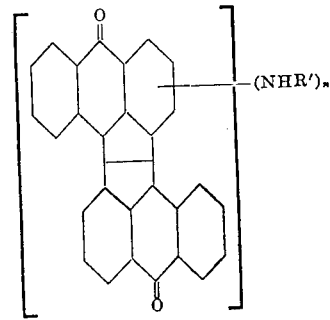

wherein R' stands for a radical selected from the group consisting of mono and dicyclic aryl radicals carrying at least one —CH$_2$—X group in which X represents an isothiouronium salt group, and $n$ is an integer.

2. The dyestuffs of claim 1, wherein R' stands for a monocyclic aryl radical.

3. The dyestuffs of claim 1, wherein R' stands for a p-toluidino radical carrying from one to four —CH$_2$—X groups in which X represents an isothiouronium salt group.

4. The dyestuffs of claim 1, wherein R' stands for a p-phenoxyanilino radical carrying at least one —CH$_2$—X group in which X represents an isothiouronium salt group.

5. The dyestuffs of claim 1, wherein R' stands for an o-anisidino radical carrying at least one —CH$_2$—X group in which X represents an isothiouronium salt group.

6. The dyestuffs of claim 1, wherein R' stands for a p-phenylanilino radical carrying at least one —CH$_2$—X group in which X represents an isothiouronium salt group.

FRANK LODGE.
JAMES WARDLEWORTH.

References Cited in the file of this patent

UNITED STATES PATENTS

| Number | Name | Date |
|---|---|---|
| 2,108,144 | Scheyer | Feb. 15, 1938 |

FOREIGN PATENTS

| Number | Country | Date |
|---|---|---|
| 612,222 | Great Britain | Nov. 10, 1948 |
| 613,980 | Great Britain | Dec. 7, 1948 |